United States Patent [19]

Sturhan et al.

[11] 4,027,619

[45] June 7, 1977

[54] INDICATION OF ROTARY SPINDLE ADJUSTMENT

[75] Inventors: Klaus Sturhan, Lemgo; Gerd Lange, Minden, both of Germany

[73] Assignee: Gebr. Isringhausen, Lemgo, Germany

[22] Filed: Aug. 27, 1975

[21] Appl. No.: 608,332

[30] Foreign Application Priority Data

| Aug. 27, 1974 | Germany | 2440979 |
| Dec. 2, 1974 | Germany | 2456828 |
| Mar. 22, 1975 | Germany | 2512736 |

[52] U.S. Cl. .................. 116/124 A; 116/115
[51] Int. Cl.² ............................. G12B 11/04
[58] Field of Search ......... 116/115, 124 A, 124 R, 116/133, DIG. 21

[56] References Cited

UNITED STATES PATENTS

| 2,753,834 | 7/1956 | Bourguignon | 116/133 |
| 2,819,698 | 1/1958 | Kirsten | 116/124 R |
| 2,987,032 | 6/1961 | Kirsten | 116/124 R |
| 3,065,728 | 11/1962 | Kirsten | 116/133 |

Primary Examiner—S. Clement Swisher
Assistant Examiner—Denis E. Corr
Attorney, Agent, or Firm—Salter & Michaelson

[57] ABSTRACT

An adjustment indicator for rotary spindles, comprising a hollow and at least partly transparent handwheel for operating the rotary spindle, and an indicator device disposed in the handwheel, the indicator device providing a reading which is controlled as a function of the revolutions of the rotary spindle.

29 Claims, 11 Drawing Figures

INDICATION OF ROTARY SPINDLE ADJUSTMENT

The invention relates to an adjustment indicator for rotary spindles, and is particularly, but not exclusively, concerned with an adjustment indicator for spindle-adjustable vehicle seats.

Known adjustment indicators, which display optically the revolutions executed by rotary spindles, involve considerable expenditure of resources on equipment and in assembly. They operate by a pick-up of translatory adjusting movement which is produced by the rotary spindle, and which is then transmitted electrically, mechanically or similarly to a separate indicator unit. This expenditure is not justifiable in cases where an approximate indication of the actual positions of the rotary spindle is sufficient, for example in adjusting elements operated by rotary spindles in machinery and in the fields of heating and sanitation.

The invention is especially intended for vehicle seats having a vibratory support, in which the spring and damping characteristics of the vibration system are adjustable according to the weight of the person occupying the seat by means of manually operable rotary spindles. An adjustment indicator for this purpose is known, for example, from German Gebrauchsmuster no. 7,145,433. The translatory adjusting movement produced by the rotary spindle is transmitted by means of a cable to a separate indicator unit which is mounted laterally on an upper frame of the seat. However, the requisite construction and assembly costs are high in relation to the approximate indication supplied by this unit, and subsequent outfitting of existing seats with this adjustment indicator is not economically viable.

An object of the invention is to create a sturdy, mechanically operable adjustment indicator, particularly, but not exclusively, for use on spindle-adjustable vehicle seats, which adjustment indicators can be manufactured and assembled at moderate cost and easily fitted to existing seats. As required on vehicle seats, the adjustment indicator should be capable of being read both laterally from the entry to the vehicle, and from above by the person occupying the seat.

According to the invention, an adjustment indicator for rotary spindles includes a hollow and at least partly transparent handwheel for operating the rotary spindle, and an indicator device disposed in said handwheel whose reading is controlled as a function of the revolutions of the rotary spindle.

The feature of an integrated handwheel adjustment indicator allows, irrespective of the manner of control of the indicator device, substantial savings to be made over earlier indicator devices independent of the handwheel. In particular, with an integrated handwheel adjustment indicator, a high degree of prefabrication can be achieved which makes possible the requisite simple outfitting of existing seats. The integrated handwheel adjustment indicator merely needs to be substituted for the standard handwheel operating the rotary spindle.

The reading of the adjustment indicator can be substantially improved, if the handwheel is constructed with a transparent front and peripheral surface, and if an indicating dial is rotatably mounted coaxially in the handwheel. Preferably, the indicating dial is appropriately provided with reading scales disposed on its front face and on a broadened peripheral edge thereof and is rotatable through 360° by means of a planetary gearing accommodated in the handwheel, or by means of spindle drive. In this manner the reading scales can be read off laterally from the entry to the vehicle, and from above by the person occupying the seat, through the transparent front and peripheral surfaces of the handwheel.

The embodiment of the handwheel adjustment indicator in which the planetary gearing is accommodated in the hollow handwheel for rotating the indicating dial is particularly study. Where planetary gearing is utilised, a fixed point of the planetary gearing may appropriately be provided by a web of the planetary gearing, which is mounted freely rotatably on the inner hub of the handwheel or on the rotary spindle and which is fitted with a pendulum weight. However, it is possible to take the fixed point from the gravitational field of the earth only in the case where the rotary spindles or handwheels are mounted substantially horizontally. Alternatively, the fixed point of the planetary gearing may be picked up by means of a holding device on a stationary bearing wall of the rotary spindle mounting. A sun wheel of the planetary gearing is preferably connected to the holding device and is mounted on the inner hub of the handwheel or on the rotary spindle, and the web of the planetary gearing is provided by a housing of the handwheel. The rear wall of the handwheel is especially suitable for the purpose, as the front wall of the handwheel should remain optically transparent for reading off the indicating dial. Where the sun wheel of the planetary gearing is fixed, special measures must be taken to mask the reading range of the scales on the indicating dial. In an advantageous embodiment of the invention, this can be done by a buyancy body which may be disposed in a circular groove filled with fluid in the handwheel or indicating dial. Alternatively, however, the reading range of the scales on the indicating dial may be determined by a pendulum dial mounted coaxially in the handwheel.

Another embodiment of the invention substantially simplifies the marking of the reading range of the scales on the indicating dial. This embodiment provides for the web of the planetary gearing to be fixed by means of the holding device. In such a case, an extended end of the fixed web must preferably be designed as a pointer which overlaps the indicating dial. When the web is fixed vertically, the pointer will be clearly visible both from the front face and from above on the peripheral edge of the handwheel.

In the embodiment of the invention which includes a fixed web, the sun wheel of the planetary gearing may be defined directly by the rotary spindle. Generally, the rotary spindle is made of metal, and the individual elements of the planetary gearing are made of plastics. Therefore, the planet wheels can be arranged to engage the rotary spindle frictionally whereby to produce a friction-wheel epicyclic gearing in a very simple manner.

If desired, the sun wheel may be defined by an interchangeable wheel pushed on to the rotary spindle. In such an embodiment, the ratio of the revolution of the indicating dial to the revolution of the rotary spindle may be adapted easily to the individual requirements of various applications. If a particularly large transformation ratio is desired, then, if planet pinions are used, the sun wheel may be provided with discontinuous toothing. In an extreme case, it may be sufficient to equip the sun wheel with one tooth or one pin or suchlike, which, as the sun wheel executes a full revolution, turns the adjoining planet pinion by one tooth division.

In the case where the handwheel adjustment indicator utilises a spindle drive to control the indicating dial, the revolutions of the rotary spindle may be converted into a translatory axial movement by means of a spindle running nut locked against rotation, and the translatory axial movement may be retranslated into a 360° revolution of the indicating dial by way of a sleeve running in a spiral guide.

Two important advantages are gained by this two-stage translation of the revolutions of the rotary spindle. On the one hand, practically any maximum revolution of the rotary spindle can be retranslated into only one revolution of the indicating dial. On the other, the two-stage transformation from a rotary movement to a translatory movement, and vice versa, affords the possibility of bridging in a very simple way greater distances from the actual thread of the rotary spindle to the handwheel adjustment indicator. This may be effected by running a connecting rod parallel to the rotary spindle, which passes on the translatory movement produced by the first transformation to the second transformation unit. Such a connecting rod also has the considerable advantage that it can easily bridge a housing wall or suchlike which exists, for example, to support a mounting of the rotary spindle between the actual spindle thread and the indicating handwheel. For this purpose, the housing wall merely needs to have a hole drilled in it at the appropriate point of the connecting-rod arrangement.

In order to avoid drilling through any housing wall, or to have a particularly short overall length of the total adjustment indicator for a rotary spindle, then, instead of the arrangement of a spindle running nut on the actual spindle thread, an arrangement of a spindle running nut on a simulator thread can be used. The simulator thread may be provided at a suitable point on the rotary spindle, for example outside the mountings of the rotary spindle or in direct proximity to the spiral guide connected to the indicating dial. Although such a simulator thread requires the same number of turns as the actual spindle thread, the pitches of the turns can be so chosen that the spindle running nut disposed on the simulator thread executes only a short translatory axial movement.

It is also very simple to adjust the indicating dial, for example to the outer left-hand or right-hand stop for the revolutions of the rotary spindle. For this purpose, the length of the connecting rod connecting the spindle running nut to the sleeve on the spiral guide is preferably adjustable. It is also advantageous to adjust the indicating dial by turning it relatively to the spiral guide. The disposition of a simple slipping clutch between spiral guide and indicating dial enables this to be done easily. The latter embodiment is recommended particularly when the translatory axial movement is not transmitted by a connecting rod, but by an outer protective tube which preferably encloses the spindle, the spindle running nut and the spiral guide with the sleeve moving in or on it.

It can be difficult for some users of a handwheel adjustment indication according to the invention to read off the indicating dial in the way envisaged, i.e. always to recognise the scale value which points upwards as being the reading. To overcome this difficulty, an embodiment of the invention provides for the reading range of the scales applied to the front face and periphery of the indicating dial to be determined by a buoyancy body which is disposed in a circular groove filled with fluid in the handwheel or indicating dial. Such a buoyancy body always points upwards and can have a color marking. It is also possible to determine the reading of the scales by a pendulum which is coaxially mounted and freely rotatable in or behind the handwheel. In addition, such a pendulum will always be in an optically fixed position, irrespective of the rotary position occupied by the handwheel or indicating dial.

In comparison with the aforementioned handwheel adjustment indicators according to the invention, which operate with planetary gearing or a spindle drive to control the indicating dial, the following alternative embodiment of handwheel adjustment indicator is particularly simple and cheap to manufacture. However, it can be used only with rotary spindles which are mounted essentially horizontally because the embodiment operates by utilising the force of gravity.

In the alternative embodiment, the spiral link is preferably disposed in the hollow handwheel coaxially of the axle of the rotary spindle and ascends over the internal width of the handwheel, the number of turns of the spiral link corresponding to the number of turns of the rotary spindle, the pendulum indicating dial guided in the spiral link being mounted on the handwheel hub. When the rotary spindle is actuated, the indicating dial will travel to and fro in the spiral link. When the handwheel is viewed on its front face, the pendulum dial is covered more or less accordingly by the spiral link. The pendulum dial has a scale printed on it, which, in conjunction with the overlap by the spiral link, will indicate the positions of the rotary spindle.

The view of the handwheel from above also presents a scale reading by virtue of the axial displacement of the pendulum dial in conjunction with a scale printed on the transparent peripheral surface of the handwheel cap.

The handwheel adjustment indicator constructed in accordance with the two immediately preceeding paragraphs can be composed simply of four components: the handwheel disc, the transparent handwheel cap, the pendulum and the spiral link. In an appropriate embodiment of the invention, the spiral link may be cut into a handwheel disc with a tapered cross section. In this manner, the spiral link and handwheel disc form one component part. The spiral link can, however, be formed just as advantageously from a truncated cone-shaped spiral spring. The spring may be supported in the cavity of the handwheel between handwheel disc and cap.

Play provided for between the pendulum dial and spiral link to ensure perfect operation of the adjustment indicator can lead to chattering, especially where the handwheel adjustment indicator is used in vehicles. To suppress this chatter, it is proposed to fill the hollow handwheel with a transparent sliding fluid. Such fluid also lubricates the relatively moveable pendulum dial and spiral link.

To ensure that the adjustment indicator operates efficiently, the natural oscillations of the pendulum brought about by vehicle jolts or acceleration of the vehicle must not cause the pendulum to somersault. It is, therefore, advantageous to equip the pendulum with braking fins which will damp out the natural oscillations. If the handwheel is filled with fluid, the natural oscillations of the pendulum can be substantially suppressed with braking fins, as the fluid does not have any eccentric mass distribution which can react to accelerative forces and is, therefore, always at rest.

Various embodiments of the invention will now be described by way of example with reference to the drawings in which.

Figures 1, 3:
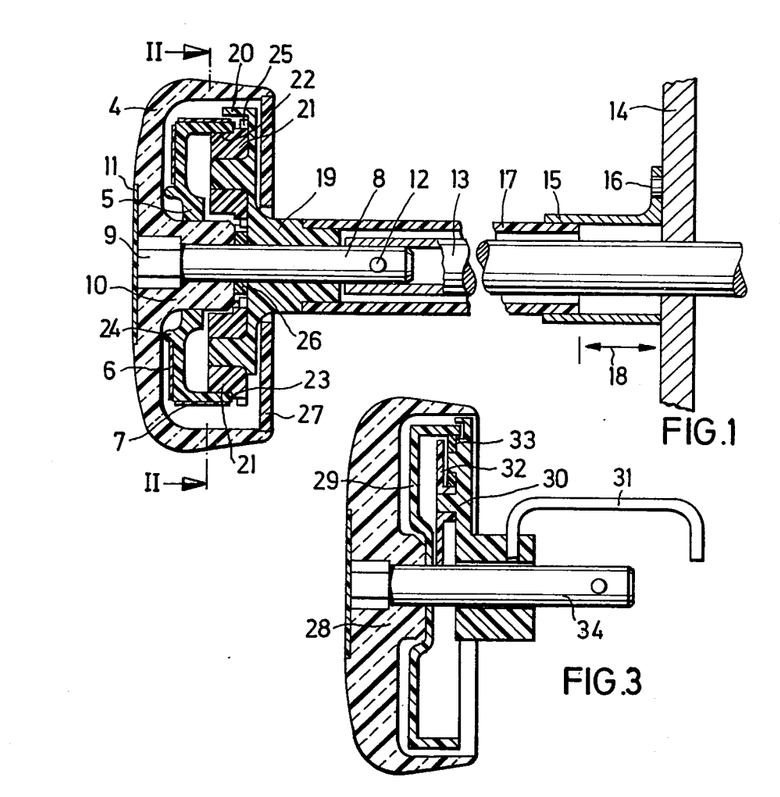
FIG. 1 is a longitudinal cross-section through a handwheel adjustment indicator according to the invention with planetary gearing.
FIG. 3 is a longitudinal cross-section through the handwheel adjustment indicator having an alternative form of planetary gearing.
Figure 2:
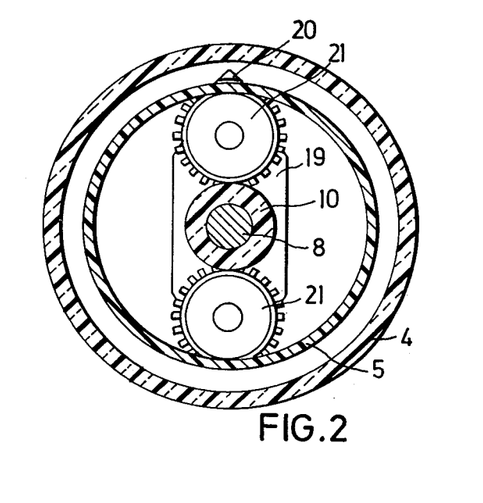
FIG. 2 is a cross-section through the handwheel adjustment indicator shown in FIG. 1 on the line II — II in FIG. 1.

The handwheel adjustment indicator shown in FIGS. 1 and 2 comprises a completely transparent handwheel 4 made, for example, of acrylic glass or a suitable plastics, and as indicating dial 5 rotatably mounted coaxially inside the handwheel. The indicating dial 5 has a scale 6 on its front face, and another scale 7 on its periphery. Both scales 6 and 7 are appropriately applied as transfer pictures, so that the scales can easily be adapted to individual applications.

The handwheel 4 is used to actuate a rotary spindle 8. The spindle 8 has a hexagonal head 9 which is secured to the handwheel; 4 to prevent relative rotation of the handwheel 4 and rotary spindle 8. The front face of a hub 10 of the handwheel 4 is masked by a visual diaphragm 11 to which a company name or other details may be applied. The rotary spindle 8 is connected by means of a split pin 12 to the hollow end of a main spindle 13 which extends through a fixed bearing wall 14 or mounted in it. The split pin 12 inhibits relative rotation of the spindles 8 and 13.

Planetary gearing is disposed in the handwheel 4 and a fixed point for the gearing is picked up from the bearing wall 14 by means of an end bush 15 which, in the embodiment shown, is bolted to the bearing wall at 16. The bus 15 could, if desired, be glued or welded to the bearing wall. A plastics tube 17 is set into the end bush 15 and cooperates therewith to define a holding device. The clearance 18 between the tube 17 and bearing wall 14 is so chosen that after the tube 17 has been pushed into the end bush 15 the split pin 12 is accessible for the handwheel to be assembled. After the split pin 12 has been inserted, the plastics tube 17 is moved out of the end bush 15 and pushed onto the hub part of a web 19 of the planetary gearing. The ends of the tube 17 are joined to the end bush 15 and the web 19 by force fitting, although grub screws or pins could be provided as means to inhibit rotation.

The web 19 of the planetary gearing has a fixed mounting and it is appropriately aligned vertically, so that the extension of its upper end also acts as a pointer 20 for the scales 6 and 7 on the indicating dial 5.

The indicating dial 5 is driven from planet wheels 21 of the epicyclic gearing which are designed as combined gear and friction wheels. The frictional surface 22 interacts with the inner peripheral surface of the indicating dial 5 and turns the latter around the handwheel hub 10. The indicating dial 5 is fixed in its axial position by bearing shoulders 23 of the planet wheels 21 and by a circular supporting edge 24.

The planet wheels 21 are driven via their toothing 25 by means of a sun wheel 26 which is attached to the rotary spindle 8 by force fitting and also acts as a spacer between the handwheel hub 10 and the web 19.

In the embodiment of the rotary-spindle adjustment indicator shown in FIGS. 1 and 2, the ratio of the revolutions of the rotary spindle to the revolution of the adjustment indicator can be changed in a simple manner. If a continuous movement of the indicator dial 5 is preferred, the planet wheels 21 and sun wheel 26 must be exchanged completely. In most cases, however, discontinuous adjustment of the indicating dial 5 is sufficient. In this case, when the transformation ratio is charged, it is necessary merely to exchange the sun wheel 26 which is formed around its periphery, depending on the ratio required, with separate teeth or cams which turn the planet wheels 21 by a tooth division. The sun wheel 26 then functions as a timer and the planet wheels 21 are timed by it.

In the embodiment illustrated in FIGS. 1 and 2, the open rear end of the handwheel 4 is sealed by a cover 27 which is clamped into the circular edge of the handwheel 4 and serves as protection when the handwheel is gripped during operation.

The embodiment shown in FIG. 3 is deliberately designed very simply, in order to demonstrate how an integrated handwheel adjustment indicator can be manufactured easily at moderate cost. Apart from a handwheel 28, only five parts are necessary, namely, an indicating dial 29, a web 30, a retaining clip 31, a planet wheel 32 and an intermediate wheel 33. In some applications with smaller transformation ratios, the intermeidate wheel 33 can usually be dispensed with. The individual parts can be made of plastics at moderate cost by injection moulding. If desired, the retaining clip 31 can be designed as a wire clip.

The embodiment illustrated in FIG. 3 shows a friction-wheel epicyclic gearing which operates with only a single planet-wheel and intermediate-wheel combination. This means that a slight unilateral pressure on the indicating dial 29 or its mounting on the rotary spindle cannot be avoided. However such pressure will not cause disturbances in operation, as the indicating dial 29 of plastics works directly on the rotary spindle 34 of metal, and radial bearing forces can be absorbed effectively. In the embodiment illustrated in FIG. 1, however, it is recommended that opposing planet wheels 21 be used, so that the forces on the indicating dial 5 are balanced completely.

Figures 4, 5, 6, 7:
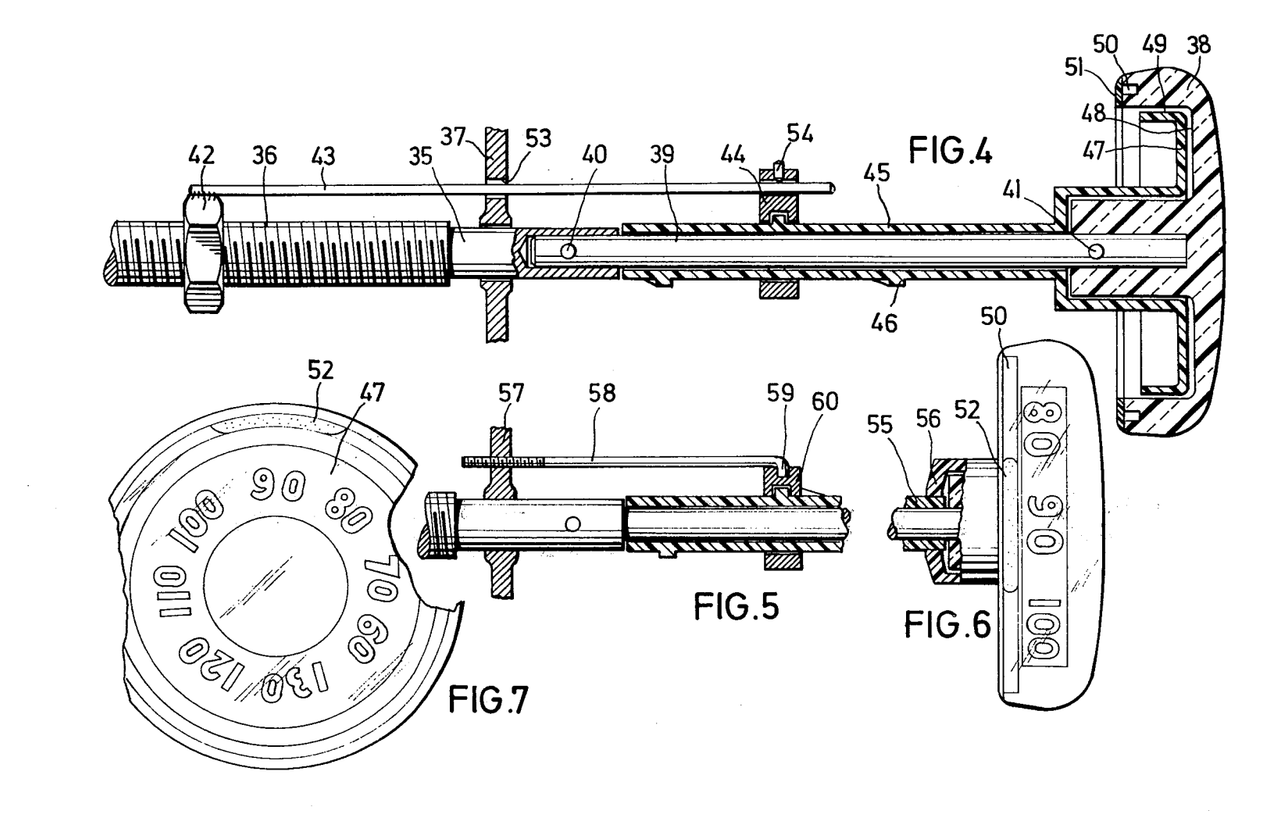
FIG. 4 is a longitudinal cross-section through a handwheel adjustment indicator having a spindle drive.
FIG. 5 is a longitudinal cross-section through the middle part of a spindle drive for rotary spindles which move axially in proportion to their rotary movement.
FIG. 6 is a top view of another handwheel adjustment indicator according to the invention.
FIG. 7 is a front view of the handwheel adjustment indicator shown in FIG. 6.

The handwheel adjustment indicator shown in FIG. 4 illustrates, on the left in the drawing, a spindle 35 with a spindle thread 36. The spindle 35 extends both sides of a housing wall 37, as is the case, for example, in a vehicle seat with a vibratory support, where the spring and damping characteristics of the vibration system are adjustable as a function of the weight of the person occupying the seat by means of the rotary spindle 35. Adjustment is carried out by means of a handwheel 38 which is secured by way of a knock-out pin 39 on the end of the rotary spindle 35, the latter being axially immovable. The adjusting members which act on the spring and damping elements of the seat, and are displaced axially on the spindle thread 36 when the spindle 35 is rotated, are not shown in FIG. 4 as they are not necessary to the functioning of the handwheel adjustment indicator according to the invention.

It is merely necessary, for the function of the handwheel adjustment indicator, to convert the rotation of the spindle 35 into a translatory axial movement in any suitable way, for example by means of a spindle running nut 42 threadly engaging the spindle thread 36. This axial movement is then transmitted by a connecting rod 43 to a sleeve 44 which is guided on an outer tube 45 pushed over the knock-out pin 39. The sleeve 44 engages a spiral guide 46 which is disposed on the outer casing of an outer tube 45. The sleeve 44 and the outer tube 45 with the spiral guide 46 represent a transmission unit whereby the translatory axial movement exerted on the sleeve 44 by the connecting rod 43 is retranslated into a rotary movement of the outer sleeve 45. The step down in ratio is such that the outer sleeve 45 executes only one 360° revolution for the maximum axial movement of the spindle running nut 42.

In the embodiment illustrated in FIG. 4, the outer sleeve 45 is connected rigidly to the indicating dial 47 which is disposed coaxially on the knock-out pin 39 or rotary spindle 35, so that it is located inside a circular recess 48, open from the rear, in the handwheel 38. The handwheel 38 consists of a transparent material, for example acrylic glass. The structural unit of the outer tube 45, the spiral guide 46 and the indicating dial 47 is appropriately injection moulded as a single unit from a plastics material.

FIGS. 6 and 7 give a clearer visual impression of how the indicating dial 47 interacts with the transparent handwheel 38. In FIG. 7, the observer looks from the front through the handwheel 38 and sees the scale graduations 60 up to 130 which, in this embodiment, indicate the weight in kilograms of a person occupying a vehicle seat. In FIG. 6, the observer looks from above onto the peripheral edge of the handwheel 38 and, likewise, sees the same scale which is applied to the broadened peripheral edge 49 of the indicating dial 47. Hence, the handwheel adjustment indicator according to the invention can be read easily from the front on entry to the driver's cab and also from above when the seat is being used.

If desired, the read-off can be made even easier, if the reading range which normally lies on the top of the scale for recognition purposes is further identified by additional means. In the embodiment shown in FIGS. 4 to 7 this is done by means of a circular groove 50 which is moulded into the rear side of the handwheel 38. The annular groove 50 is substantially filled with a fluid and then sealed by gluing on a back cover 51. The incomplete filling of the annular groove with fluid gives rise to an air bubble 52 which is very clearly visible, especially in slightly coloured fluids. This air bubble 52 is always in the uppermost position in any setting of the handwheel 38 and clearly reveals the reading range of the scale on the front face, and also that of the scale on the periphery, since the annular groove 50 is so disposed that it is easily recognisable in both reading directions, and does not overlap the scales.

Instead of the annular groove 50 being disposed in the handwheel 38, an annular grove or sucklike could, of course, be defined in the indicating dial 47. Alternatively, an enclosed circular tube substantially filled with fluid could be glued from the rear to the indicating dial 47 in the upper corner edge between the scale on the periphery and the scale on the front face. In this way, the reading range of the scales would be clearly marked by the air bubble in the circular tube. Another possibility of identifying the reading range could be afforded in a simple manner by attaching coaxially in or directly behind the handwheel 38 a pendulum dial which would always mark the upper reading range of the scales by means of an arrow or a display window or suchlike.

Assembly of the handwheel adjustment indicator according to the invention is very straightforward and it can be fitted to existing seats at moderate cost. On fitting the handwheel adjustment indicator to an existing vehicle seat, the old handwheel is first removed by loosening the split pin 40. The next step is simply to drill through the housing wall 37 at 53 and then insert the connecting rod 43 (shown on the left-hand side in the FIG. 4) in the hole 53. The connecting rod 43 is then welded directly to the adjusting member (not shown) disposed on the spindle thread 36 for the purpose of adjusting the spring and damping characteristics of the vibration system of the seat. The spindle running nut 42 shown in FIG. 4 can then be abandoned. The finished unit, consisting of the knock-out pin 39 with the outer tube 45, sleeve 44 and indicator handwheel 38, 47, is then slipped onto the end of the spindle 35 and locked again with the split pin 40. The fitted handwheel adjustment indicator is immediately ready to operate, as the connecting rod 43 fixed in the hole 53 in the peripheral direction also acts as a guard against torsion for the sleeve 44 running in the spiral guide 46 and, if need be, also a guard against torsion for the adjusting members or running nut 42 on the spindle thread. It is very simple to readjust the adjustment indicator according to the invention. For readjustment purposes, the sleeve 44 running in the spiral guide 46 can be displaced axially after a grub screw 54 has been loosened, as a result of which the indicating dial 47 will move into the corresponding position for readjustment. The grub screw 54 is then retightened. FIG. 6 shows another possibility for readjusting the adjustment indicator. It is noticeable here that the outer tube 55 is not connected in one piece to the hub 56 of the indicating dial. In fact, the hub 56 can be turned to readjust the indicating dial when a sufficiently large force is applied to the outer tube 55.

Whereas the embodiment illustrated in FIG. 4 shows a handwheel adjustment indicator, for use with rotary spindles which do not move axially, FIG. 5 shows an embodiment of the invention for rotary spindles which move axially in proportion to their revolutions in relation to a housing wall 57. In such a case, the translatory axial movement can be picked up directly on the housing wall 57 in which a connecting rod 58 is inserted. The connecting rod 58 has a cranked end 59 which locates in a sleeve 60. The sleeve 60 has the same function as the sleeve 44 in FIG. 4. In the embodiment illustrated in FIG. 5, the adjustment indicator is readjusted by operating a slipping clutch disposed between the outer tube and indicating dial (FIG. 6).

Figures 8, 9:
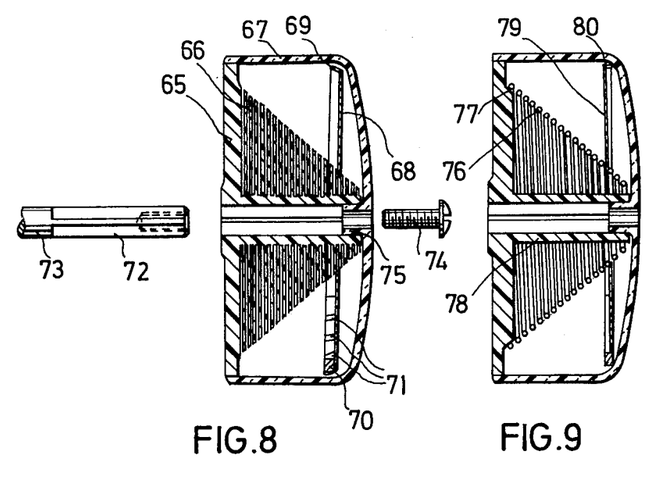
FIG. 8 is a longitudinal cross-section through a further handwheel adjustment indicator according to the invention, which operates with a pendulum dial subject to the force of gravity.
FIG. 9 is a longitudinal cross-section through a handwheel adjustment indicator similar to that shown in FIG. 8, but with a truncated cone-shaped spring as a spiral link.

The handwheel adjustment indicator shown in FIG. 8 consists of a handwheel disc 65 of tapered cross section, into whose tapered part 66 a spiral link is cut or moulded. The handwheel disc 65 is overlapped by a handwheel cap 67 which is formed a transparent plastics material. In certain cases, the handwheel disc may also be made of plastics. In such cases the handwheel cap and handwheel disc can be welded together in a simple manner. Before the handwheel cap is placed over the disc, a pendulum dial 68 is screwed on to the spiral ink.

The pendulum dial 68 is appropriately stamped from a metal sheet whose outer edges 69 are flanged. This gives a broader edge which enables the axial position of the pendulum dial 68 to be read off more easily. In the lower peripheral area, the pendulum dial 68 is weighted by a pendulum weight 70. Braking fins 71 may support the pendulum weight 70 and can also be disposed in this area.

The handwheel adjustment indicator is slipped onto a square end 72 of a rotary spindle 73 and secured in position by a screw 74. The hub of the handwheel disc 65 is formed for this purpose with a suitable square cross-section hole in which a square cross-section extension 75 of a handwheel cap 67 locates from the opposite side. In this way, the torque applied manually is transmitted to the rotary spindle 73 both by way of the handwheel disc 65 and by way of the handwheel cap 67.

The handwheel adjustment indicator illustrated in FIG. 9 consists altogether of four components, the spiral link being defined in this embodiment by a truncated cone-shaped spring 76. After the handwheel has been assembled, the truncated cone-shaped spring 76 is fixed between an annular shoulder 77 and a hub 78. The truncated cone-shaped spring 76 can be manufactured at reasonably low cost. Similary to the spiral link 66 in FIG. 8, the spring 76 can also be disposed with an opposite pitch inside the handwheel, so that there is no change in the principle of a combined front-face and peripheral indication.

In FIG. 9, the peripheral edge 80 of a pendulum dial 79 balances out the inclination of the dial arising from the pitch of the spiral link, so that to the observer the peripheral edge 80 of the pendulum dial is always aligned parallel to the handwheel disc.

Figure 10:
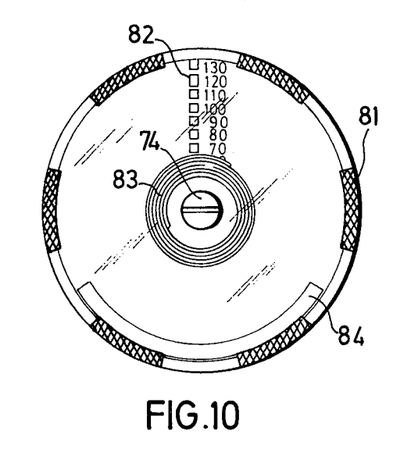
FIG. 10 is a view of the front face of a handwheel adjustment indicator of the kind shown in FIGS. 8 and 9.
Figure 11:
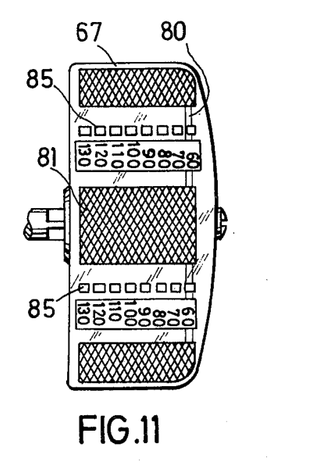
FIG. 11 is a plan view of a handwheel adjustment indicator of the kind shown in FIGS. 8 and 9.

The external appearance of one form of handwheel adjustment indicator according to the invention is illustrated in FIGS. 10 and 11. The transparent handwheel cap 67 is provided with gripping zones 81 between which are defined free zones for the disposition of the scales. FIG. 10 shows a view of the front face of the handwheel and a scale 82, which is printed on the pendulum dial 68 or 79, can be seen. The scale 82 is overlapped, according to the axial displacement of the pendulum dial, by a spiral link 83 which can be either the spiral link 66 in FIG. 8, or the spiral link 76 in FIG. 9. The remaining centre part of the handwheel cap 67 directly surrounding the assembly screw 74 is left free, so that a company name or suchlike can be printed on it. The outer peripheral edge of the pendulum dial, shown in FIG. 10 by the labelling section 84, is also suitable for company names, as the peripheral edge always remains uncovered by the spiral link.

FIG. 11 illustrates the peripheral scales which are applied at regular intervals to the periphery of the handwheel cap, so that in any position of rotation of the handwheel, at least one scale 85 can be read off according to the axial position of the peripheral edge 80 of the pendulum dial 79.

Readjustment of the adjustment indicator in accordance with the positions of the rotary spindle is very simple. The spindle 73 is turned as far as an end stop, the handwheel is then detached and turned as far as the corresponding end stop of the pendulum dial, and the handwheel is finally pushed onto the spindle again and fastened.

What we claim as our invention and desire to secure by Letters Patent of the United States is:

1. An adjustment indicator for a rotary spindle, comprising a hollow and at least partly transparent handwheel for operating the rotary spindle, and an indicator device disposed in said handwheel whose reading is controlled as a function of the revolutions of the rotary spindle, said handwheel being constructed with a transparent front and peripheral surface, and an indicating dial being rotatably mounted coaxially in the handwheel, reading scales being located on the front face and on a broadened peripheral edge of said indicating dial, a planetary gearing mounted in said handwheel and being operatively connected to said indicating dial for producing 360° rotation thereof, a holding device mounted on a stationary bearing wall of the rotary spindle mounting and cooperating with said planetary gearing to locate a fixed point of said planetary gearing, said planetary gearing including a sun wheel that is mounted on the inner hub of said handwheel and a web of said planetary gearing being formed in said handwheel.

2. An adjustment indicator, as in claim 1, wherein the reading range of the scales on the indicating dial is determined by a buoyancy body which is disposed in a circular groove filled with fluid in the handwheel or the indicating dial.

3. An adjustment indicator, as in claim 1, wherein the reading range of the scales on the indicating dial is determined by a pendulum dial mounted coaxially in the handwheel.

4. An adjustment indicator for a rotary spindle, comprising a hollow and at least partly transparent handwheel for operating the rotary spindle, and an indicator device disposed in said handwheel whose reading is controlled as a function of the revolutions of the rotary spindle, said handwheel being constructed with a transparent front and peripheral surface, and an indicating being rotatably mounted coaxially in the handwheel, reading scaes being located on the front face and on a broadened peripheral edge of said indicating dial, said indicating dial being rotatable through a maximum of 360° by means of a spindle drive, the revolutions of said rotary spindle being converted into a translatory axial movement by means of a spindle running nut locked against rotation, the translatory axial movement being retranslated into a 360° revolution of the indicating dial by way of a sleeve running in a spiral guide.

5. An adjustment indicator, as in claim 4, wherein the spiral guide is mounted as a coaxial outer tube on the end of the rotary spindle holding the handwheel, and wherein the outer tube is connected, so as not to rotate, to the indicating dial mounted coaxially in the handwheel.

6. An adjustment indicator, as in claim 5, wherein the spindle running nut is connected by way of a connecting rod to the sleeve running in the spiral guide.

7. An adjustment indicator, as in claim 6, wherein the axial distance of the spindle running nut from the sleeve is adjustable by changing the length of the connecting rod.

8. An adjustment indicator, as in claim 6, wherein the spindle running nut is disposed directly in the thread of the rotary spindle, and wherein the connecting rod bridges a mounting of the rotary spindle existing between the spindle thread and the outer tube attached to the end of the rotary spindle.

9. An adjustment indicator, as in claim 5, wherein the connection between the outer tube and indicating dial is designed as a slipping clutch.

10. An adjustment indicator, as in claim 4, wherein the spindle running nut runs on a simulator thread which is disposed outside the mountings of the rotary spindle on the axle of the rotary spindle.

11. An adjustment indicator, as in claim 4, wherein the spindle running nut is connected by an outer protective tube to the sleeve running in the spiral guide.

12. An adjustment indicator, as in claim 4, for rotary spindles moving axially in proportion to their revolutions, wherein the spindle running nut is replaced by a fixed bearing wall of the rotary spindle mounting.

13. An adjustment indicator, as in claim 4, wherein the reading range of the scales is determined by a buoyancy body which is disposed in a circular groove filled with fluid in the handwheel or indicating dial.

14. An adjustment indicator, as in claim 4, wherein the reading range of the scales is determined by a pendulum dial which is coaxially mounted and freely rotatable in or behind the handwheel.

15. An adjustment indicator for a rotary spindle, comprising a hollow and at least partly transparent handwheel for operating the rotary spindle, and an indicator device disposed in said handwheel whose reading is controlled as a function of the revolutions of the rotary spindle, said handwheel being constructed with a transparent front and peripheral surface, and an indicating dial being rotatably mounted coaxially in the handwheel, a reading scale being located on the front face of the indicating dial and on a peripheral edge of the handwheel, said indicating dial being designed as a pendulum, subject to the force of gravity, which is guided in a spiral link disposed in said handwheel, said spiral link being disposed in said hollow handwheel coaxially of the axle of said rotary spindle and ascending over the internal width of the handwheel, the number of turns of said spiral link corresponding to the number of turns of said rotary spindle, said pendulum indicating dial that is guided in the spiral link being mounted on a hub of said handwheel.

16. An adjustment indicator, as in claim 15, wherein the spiral ink is cut into a handwheel disc with a tapered cross section.

17. An adjustment indicator, as in claim 15, wherein the spiral ink is provided by a turncated cone-shaped spring.

18. An adjustment indicator for a rotary spindle, comprising a hollow and at least partly transparent handwheel for operating the rotary spindle, and an indicator device disposed in said handwheel whose reading is controlled as a function of the revolutions of the rotary spindle, said handwheel being constructed with a transparent front and peripheral surface, and an indicating dial being rotatably mounted coaxially in the handwheel, a reading scale being located on the front face of the indicating dial and on a peripheral edge of the handwheel, said indicating dial being designed as a pendulum, subject to the force of gravity, which is guided in a spiral link disposed in said handwheel, said hollow handwheel being filled with a transparent sliding fluid.

19. An adjustment indicator, as in claim 18, wherein the pendulum is equipped with braking fins.

20. An adjustment indicator for use with a rotary spindle, comprising a transparent handwheel that is interconnected to said spindle, said handwheel having a front face to which an annular peripheral edge is joined and defining an interior chamber therewith, indicating dial means located in said chamber and including a front face that is visible through the front face of said handwheel and a peripheral face that is visible through the peripheral edge of said handwheel, reading scales located on said indicating dial means for viewing through the front face and peripheral face of said handwheel, planetary gearing including a web, sun wheel and planetary gears mounted in said chamber, a holding device being fixed adjacent said rotary spindle and being interconnected to said web, said web having an extended end that defines a pointer which overlaps said indicating dial means and is fixed relative to said planetary gears.

21. An adjustment indicator as claimed in claim 20, said sun wheel being formed with discontinuous toothing.

22. An adjustment indicator as claimed in claim 21, said sun wheel being connected directly to said rotary spindle.

23. An adjustment indicator, as in claim 20, wherein the sun wheel is defined by an interchangeable wheel pushed on to the rotary spindle.

24. An adjustment indicator, as in claim 20, wherein the holding device is provided by an outer tube which encases the rotary spindle.

25. An adjustment indicator, as in claim 20, wherein the handwheel is provided with a back protective cover.

26. An adjustment indicator for a rotary spindle, comprising a hollow and at least partly transparent handwheel for operating the rotary spindle, and an indicator device disposed in said handwheel whose reading is controlled as a function of the revolutions of the rotary spindle, said handwheel being constructed with a transparent front and peripheral surface, and an indicating dial being rotatably mounted coaxially in the handwheel, a reading scale being located on the front face of the indicating dial and on a peripheral edge of the handwheel, said indicating dial being designed as a pendulum, subject to the force of gravity, which is guided in a spiral link disposed in said handwheel.

27. An adjustment indicator for a rotary spindle, comprising a hollow and at least partly transparent handwheel for operating the rotary spindle, and an indicator device disposed in said handwheel whose reading is controlled as a function of the revolutions of the rotary spindle, said handwheel being constructed with a transparent front and peripheral surface, and an indicating dial being rotatably mounted coaxially in the handwheel, reading scales being located on the front face and on a broadened peripheral edge of said indicating dial, a planetary gearing mounted in said handwheel and being operatively connected to said indicating dial for producing 360° rotation thereof, wherein a fixed point of the planetary gearing is provided by a web on the planetary gearing, which is mounted freely rotatably on the inner hub of the handwheel or on the rotary spindle and which is equipped with a pendulum weight.

28. An adjustment indicator for a rotary spindle, comprising a hollow and at least partly transparent handwheel for operating the rotary spindle, and an indicator device disposed in said handwheel whose reading is controlled as a function of the revolutions of the rotary spindle, said handwheel being constructed with a transparent front and peripheral surface, and an indicating dial being rotatably mounted coaxially in the handwheel, reading scales being located on the front face and on a broadened peripheral edge of said indicating dial, a planetary gearing mounted in said handwheel and being operatively connected to said indicating dial for producing 360° rotation thereof, a holding device mounted on a stationary bearing wall of the rotary spindle mounting and cooperating with said planetary gearing to locate a fixed point of said planetary gearing, said planetary gearing including a web that is fixed in position by said holding device, said web having an extended end that defines a pointer which overlaps said indicating dial.

29. An adjustment indicator for a rotary spindle, comprising a hollow and at least partly transparent handwheel for operating the rotary spindle, and an indicator device disposed in said handwheel whose reading is controlled as a function of the revolutions of the rotary spindle, said handwheel being constructed with a transparent front and peripheral surface, and an indicating dial being rotatably mounted coaxially in the handwheel, reading scales being located on the front face and on a broadened peripheral edge of said indicating dial, a planetary gearing mounted in said handwheel and being operatively connected to said indicating dial for producing 360° rotation thereof, a holding device mounted on a stationary bearing wall of the rotary spindle mounting and cooperating with said planetary gearing to locate a fixed point of said planetary gearing, said planetary gearing including a web that is fixed in position by said holding device, said planetary gearing including a sun wheel that is defined by an interchangeable wheel engaging said rotary spindle, said sun wheel being formed with discontinuous toothing.

* * * * *